(12) United States Patent
Hecht

(10) Patent No.: US 7,578,640 B2
(45) Date of Patent: Aug. 25, 2009

(54) CUTTING TOOL HAVING CUTTING INSERT SECURED BY NON-PENETRATING ABUTMENT OF A THREADED FASTENER

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 11/843,300

(22) Filed: Aug. 22, 2007

(65) Prior Publication Data

US 2008/0080937 A1 Apr. 3, 2008

(30) Foreign Application Priority Data

Sep. 28, 2006 (IL) .................................. 178377

(51) Int. Cl.
*B23B 29/04* (2006.01)
*B23B 27/16* (2006.01)

(52) U.S. Cl. .................. 407/103; 407/117; 407/113

(58) Field of Classification Search .................. 407/40, 407/47, 49, 50, 100, 103, 107–110, 113, 407/117
See application file for complete search history.

(56) References Cited

U.S. PATENT DOCUMENTS

| 80,929 | A | * | 8/1868 | Disston | ..................... | 83/845 |
|---|---|---|---|---|---|---|
| 579,383 | A | * | 3/1897 | Coyle | ..................... | 83/840 |
| 912,774 | A | * | 2/1909 | Aupperle | ..................... | 83/840 |
| 1,184,368 | A | * | 5/1916 | Morgal | ..................... | 407/47 |
| 1,608,182 | A | * | 11/1926 | Pospiech | ..................... | 83/841 |
| 3,162,928 | A |  | 12/1964 | Kruse |  |  |
| 3,551,975 | A |  | 1/1971 | Novkov |  |  |
| 3,785,021 | A |  | 1/1974 | Norgren |  |  |
| 4,417,833 | A |  | 11/1983 | Wertheimer |  |  |
| 4,443,136 | A | * | 4/1984 | Kemmer | ..................... | 407/72 |
| 4,580,930 | A |  | 4/1986 | Zinner |  |  |
| 4,588,333 | A |  | 5/1986 | Gustafson |  |  |
| 4,588,974 | A |  | 5/1986 | Hill |  |  |
| 4,645,385 | A |  | 2/1987 | Keller |  |  |
| 4,744,278 | A |  | 5/1988 | Wright |  |  |
| 4,801,224 | A |  | 1/1989 | Pettersson et al. |  |  |
| 4,946,319 | A | * | 8/1990 | Lyon et al. | ..................... | 407/115 |
| 5,022,796 | A |  | 6/1991 | Pano et al. |  |  |
| 5,150,992 | A |  | 9/1992 | Friedmann |  |  |
| 5,308,197 | A | * | 5/1994 | Little | ..................... | 407/101 |

(Continued)

FOREIGN PATENT DOCUMENTS

DE 4037984 6/1991

(Continued)

OTHER PUBLICATIONS

International Search Report, PCT/IL2007/001058, dated Sep. 1, 2008.

(Continued)

*Primary Examiner*—Boyer D Ashley
*Assistant Examiner*—Sara Addisu
(74) *Attorney, Agent, or Firm*—Womble Carlyle

(57) ABSTRACT

A cutting insert is retained in a cutting tool through a combination of resilient clamping and abutment by a threaded fastener. The threaded fastener, which abuts but does not penetrate cutting insert, pre-loads the cutting insert against cutting forces, by biasing the cutting insert against a jaw of the cutting tool.

31 Claims, 10 Drawing Sheets

U.S. PATENT DOCUMENTS

| | | |
|---|---|---|
| 5,360,298 A | 11/1994 | Hedlund |
| 5,411,354 A | 5/1995 | Gustafsson |
| 5,439,327 A | 8/1995 | Wertheim |
| 5,775,854 A | 7/1998 | Wertheim |
| 5,829,924 A | 11/1998 | Oshnock et al. |
| 5,934,843 A | 8/1999 | Brask et al. |
| 6,116,823 A | 9/2000 | Mihic |
| 6,565,292 B2 | 5/2003 | Hecht |
| 6,702,527 B2 | 3/2004 | Barazani |
| 6,702,529 B1 | 3/2004 | Tagtstrom et al. |
| 6,758,638 B1 * | 7/2004 | Mihic .......................... 407/107 |
| 7,163,361 B2 * | 1/2007 | Hecht .......................... 407/109 |
| 7,331,096 B2 * | 2/2008 | Kugler et al. .............. 29/426.5 |
| 2002/0081165 A1 | 6/2002 | Hecht |
| 2002/0176754 A1 | 11/2002 | Barazani |
| 2005/0232712 A1 | 10/2005 | Hecht |
| 2006/0120812 A1 | 6/2006 | Hecht et al. |
| 2009/0035076 A1 * | 2/2009 | Hecht .......................... 407/113 |

FOREIGN PATENT DOCUMENTS

| | | |
|---|---|---|
| DE | 102006001747 A1 * | 7/2007 |
| EP | 0012211 | 6/1980 |
| EP | 1543907 | 12/2004 |

OTHER PUBLICATIONS

International Search Report, PCT/IL2005/000307, dated Jul. 6, 2005.

* cited by examiner

CUTTING TOOL HAVING CUTTING INSERT SECURED BY NON-PENETRATING ABUTMENT OF A THREADED FASTENER

FIELD OF THE INVENTION

The present invention relates to cutting tools of the type in which a cutting insert is clamped in an insert pocket by means of a threaded fastener, such as a screw. More particularly, it concerns such a cutting tool in which the threaded member abuts, but does not pass through the cutting insert.

BACKGROUND OF THE INVENTION

Cutting tools employing a resilient clamping mechanism for clamping cutting inserts are generally of relatively narrow thickness, typically in the range of 5 mm to 12 mm and the cutting insert is retained in an insert pocket located between the clamping surfaces of upper and lower jaws of the cutting tool. In cutting operations such as grooving and parting off the cutting tool is in the form of a holder blade. The holder blade is, in turn, generally clamped in a blade-retaining block. The holder blade is generally provided with a suitably designed opening, in the vicinity of the insert pocket whereby a relatively narrow bridging portion is formed enabling a limited degree of resilient displacement of one of the holder blade's jaws relative to the other. Generally, the lower jaw is rigid and the upper jaw is resiliently displaceable. The opening can be of the form of an aperture, or a slot, or a slot terminating in an aperture. Examples of such cutting tools are disclosed in U.S. Pat. No. 3,785,021, U.S. Pat. No. 4,580,930 and U.S. Pat. No. 5,829,924. A rotary slot-cutting tool employing a resilient insert clamping mechanism is disclosed in U.S. Pat. No. 4,417,833. The cutter body is disc-shaped and of relatively narrow thickness, with cutting insert pockets located around its periphery. As with the holder blade, an insert pocket of a rotary slot-cutting tool has two jaws between which an insert is clamped by means of the resilient force resulting from the displacement of the clamping jaw.

Whether the cutting tool is a holder blade or a rotary slot cutting tool, the displacement of the clamping jaw is obtained by manufacturing the insert pocket so that the distance between the clamping surfaces of the jaws is smaller than the height of the portion of the insert located between the clamping surfaces. Consequently, when an insert is located in the insert pocket, the clamping jaw is held in a displaced position creating an elastic force by means of which the insert is clamped in position.

A well-known problem with cutting tools of the type described above is that the cutting insert is not positively secured in the insert pocket and therefore can become dislodged during cutting operations. For example, this can happen during grooving operations when attempting to withdraw the holder blade from a workpiece. In some cases the cutting insert can be completely pulled out of the holder blade and become embedded in the workpiece. Additionally, because cutting tools of the prior art rely on friction and/or resilient clamping to secure the inserts in the insert pocket, the inserts might not be sufficiently or precisely secured in the insert pocket which may lead to relative movement between the insert and the insert pocket during initial contact of the insert with the workpiece thereby possibly leading to damage to the workpiece or the cutting tool.

SUMMARY OF THE INVENTION

In accordance with one aspect of the present invention there is provided a cutting insert. The inventive cutting insert includes: an upper surface, a lower surface and a peripheral side surface extending between the upper and lower surfaces; the peripheral side surface comprising opposing forward and rear surfaces and opposing side surfaces extending between the forward and rear surfaces; a first cutting edge formed at the intersection of a forward portion of the upper surface with an upper portion of the forward surface; and a clamping recess formed at an intersection between a rear portion of the upper surface and an upper portion of the rear surface, the clamping recess comprising a recess abutment surface extending widthwise of the rear surface, the recess abutment surface being arcuate, in a top view of the insert.

The clamping recess may extend across the entire width of the rear surface. The recess abutment surface may also extend across the entire width of the rear surface. In addition, the recess abutment surface may comprise a conical surface. Also, the recess abutment surface may be visible in both a top view and a rear end view of the cutting insert.

The rear surface may comprise a concave surface that communicates with the clamping recess and extends downwardly to the lower surface.

The forward portion of the upper surface and the rear portion of the upper surface are approximately at the same level, in a side view of the cutting insert.

The lower surface may be stepped in a side view of the cutting insert, the lower surface having a lower locating surface that is vertically spaced apart from a non-locating free surface by a forward locating surface; the forward locating surface opposes a rear locating surface which forms part of the rear surface; the lower locating surface is between the forward surface and the forward locating surface; and the lower locating surface is vertically higher than the non-locating free surface. In such case, the rear surface, including the rear locating surface, may comprise a concave surface that communicates with the clamping recess and extends downwardly to the non-locating free surface. Also in such case, the forward locating surface and rear locating surface may converge towards one another in a direction of the non-locating free surface. Furthermore, in such case, the cutting insert is flag-shaped, in a side view thereof.

The cutting insert may be devoid of a through bore suitable for accommodating a clamping screw.

In accordance with another aspect of the present invention there is provided a cutting tool. The inventive cutting tool comprises: an insert holder having a clamping portion comprising: a base jaw having a base jaw abutment surface and a threaded bore adjacent the base jaw abutment surface; and a clamping jaw connected to a base jaw and having unitary one-piece construction therewith, the clamping jaw having a clamping jaw clamping surface facing opposite a lower portion of the base jaw abutment surface. The inventive cutting tool also includes the above-mentioned cutting insert seated between the clamping jaw and the base jaw; and a threaded fastener retained in the threaded bore of the base jaw with a screw clamping surface of the threaded fastener abutting the recess abutment surface of the cutting insert, without the threaded fastener penetrating the cutting insert.

When the clamping surface of the threaded fastener abuts the recess abutment surface of the cutting insert, the cutting insert may be forced against clamping jaw, thereby securing the insert in the insert holder.

In the tool, the cutting insert may be devoid of a through bore suitable for receiving the threaded fastener, and so only the clamping surface of the threaded fastener contacts the cutting insert.

The threaded bore has an opening which is surrounded by a seating surface shaped and dimensioned to receive the screw clamping surface of the threaded fastener; and in a top view of the cutting insert, a forward portion of the seating surface has a first radial thickness that is smaller than a second radial thickness of a rear portion of the seating surface.

A forwardly facing portion of the screw clamping surface may cover the narrow forward portion of the seating surface and extend in the forward direction of the tool so that it overlies and abuts a rearwardly facing portion of the recess abutment surface.

The threaded fastener may be tilted at a non-zero angle relative to a normal to an upper surface of cutting insert, in which upper surface the clamping recess is formed.

The clamping jaw is provided with an insert stop surface that is generally transverse to the base jaw clamping surface. The base jaw abutment surface abuts the rear surface of the cutting insert; the clamping jaw clamping surface abuts the forward locating surface of the cutting insert; and the insert stop surface of the clamping jaw abuts the lower locating surface of the cutting insert.

The insert stop surface and the base jaw abutment surface may both be convex.

The base jaw abutment surface may be divided by a base recess into an upper abutment surface and lower abutment surface.

In a side view of the cutting tool the clamping jaw is provided with an insert stop surface that is generally transverse to the base jaw abutment surface. The insert stop surface may slope downwardly and forwardly, from proximate the clamping jaw clamping surface to a front face of the insert holder, while the cutting insert's lower locating surface may slope downwardly and forwardly, from the forward locating surface towards the forward surface. In such case, the downwardly and forwardly sloping lower locating surface may abut the downwardly and forwardly sloping insert stop surface.

The insert holder's base jaw may be connected to the clamping jaw via a pocket recess; the cutting insert's lower surface may be stepped in a side view of the cutting insert, the lower surface having a lower locating surface that is vertically spaced apart from a non-locating free surface by a forward locating surface; and the non-locating free surface may be open to the pocket recess.

The cutting tool may be a rotary slot cutting tool. The cutting tool may instead be any one of a grooving or a parting off or turning tool, in which case the insert holder may comprise a holder blade.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
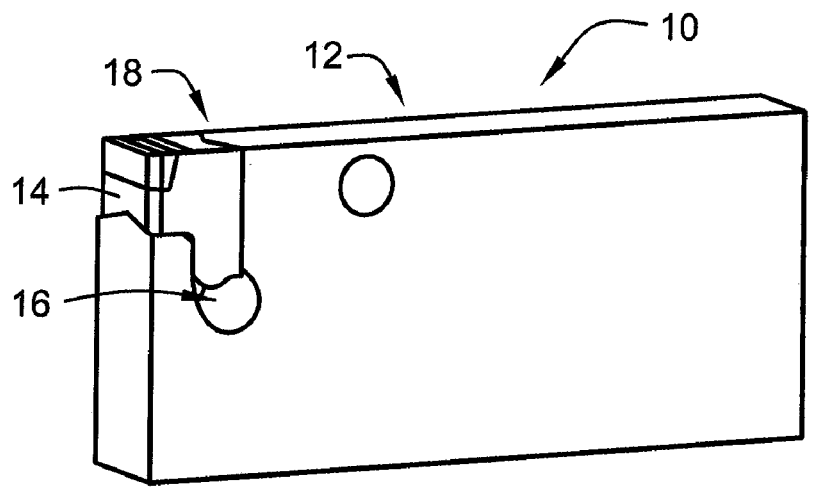
FIG. 1 is a perspective view of a first cutting tool having resilient clamping only.
Figure 2:
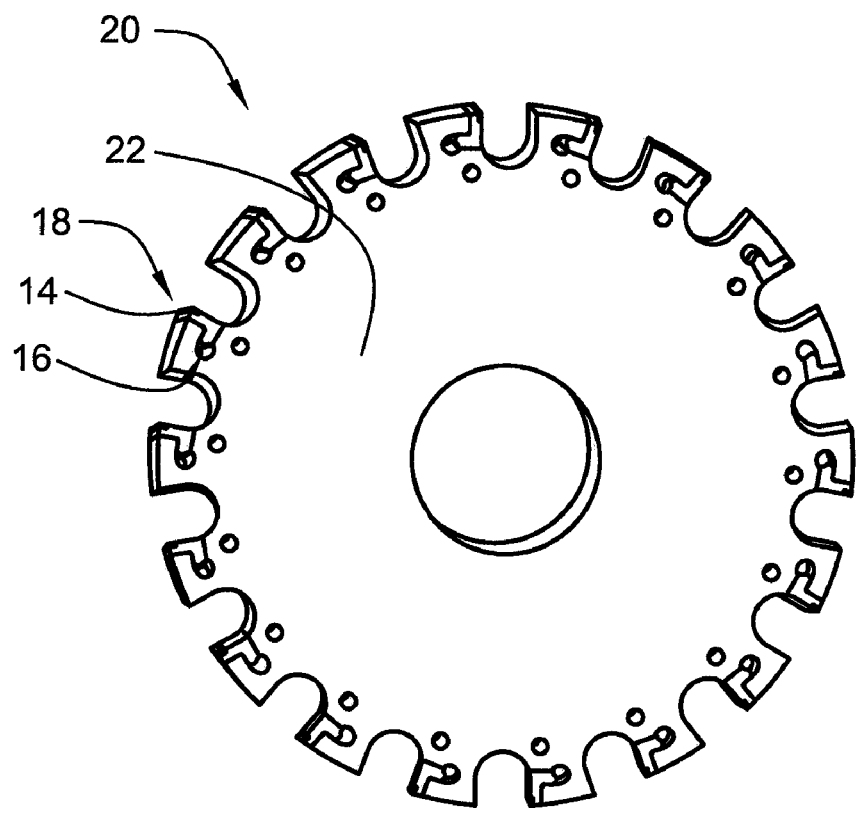
FIG. 2 is a perspective view of a second cutting tool having resilient clamping only.

FIGS. 1 and 2 show two cutting tools in which a cutting insert is retained by resilient clamping only, without the use of other clamps or screws.

Figure 3:
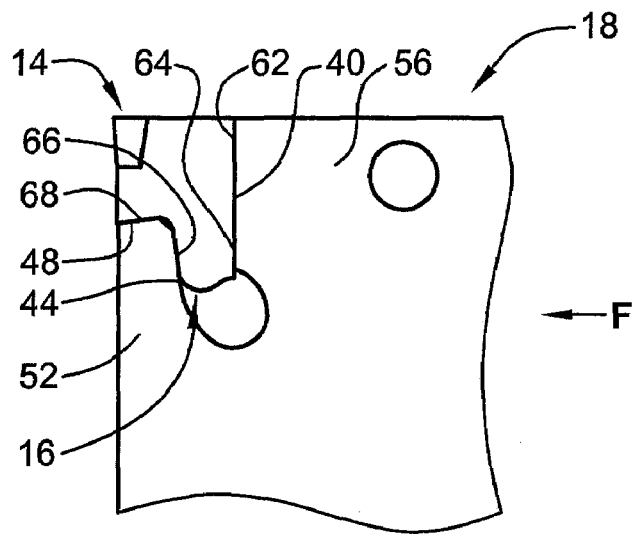
FIG. 3 is a side view of a cutting section of either cutting tool of FIG. 1 or FIG. 2.

FIG. 1 shows a first cutting tool 10 used for metal cutting operations such as grooving and parting off. The first cutting tool 10 comprises an insert holder 12 in the form of a rectangular blade with a cutting insert 14 resiliently retained in an insert pocket 16. The cutting insert 14 is typically manufactured by form-pressing and sintering carbide powders. FIG. 2 shows a second cutting tool 20, used for rotary slot metal cutting operations. The second cutting tool 20 comprises an insert holder 22 in the form of a circular disc with cutting inserts 14 resiliently retained in identical insert pockets 16 arranged around the periphery of the disc. The cutting tools 10, 20 comprise a cutting section 18 which includes the cutting insert 14, the insert pocket 16 and the immediate vicinity of the insert pocket 16. The cutting section 18 is shown in FIG. 3. It should be noted that directional terms appearing throughout the specification and claims, e.g. "forward", "rear", "upper", "lower", "vertical", etc., are used as terms of convenience to distinguish the location of various surfaces relative to each other. These terms are defined with reference to FIGS. 3, 4 and 5; however, they are used for illustrative purposes only, and are not intended to limit the scope of the appended claims.

Figure 4:
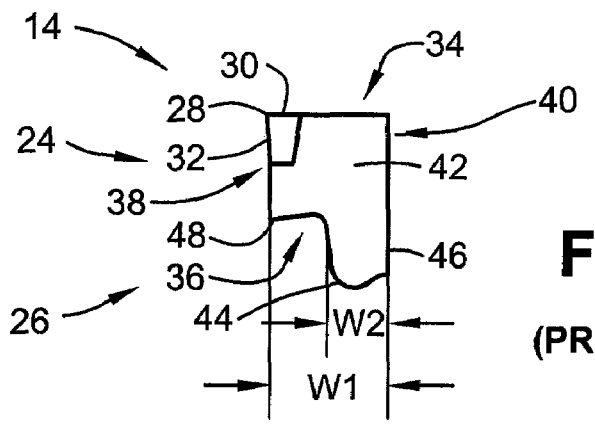
FIG. 4 is a side view of a first cutting insert suitable for resilient clamping only.

Attention is now drawn to FIG. 4. The cutting insert 14 comprises a cutting portion 24 and a locating portion 26. The cutting portion 24 comprises a cutting edge 28 formed at an intersection of a rake surface 30 and a relief surface 32. The cutting insert 14 further comprises an upper surface 34, a lower surface 36 and a peripheral side surface therebetween. The peripheral side surface comprises opposing forward and rear surfaces 38, 40 and opposing side surfaces 42 extending between the forward and rear surfaces 38, 40. The relief surface 32 is located in the forward surface 38 and the rake surface 30 is located in the upper surface 34. A first distance W1 is defined between the forward surface 38 and the rear surface 40. The locating portion 26 extends downwardly from the cutting portion 24 in a direction away from upper surface 34 and comprises opposing forward and rear locating surfaces 44, 46 that converge downwardly. A second distance W2 is defined between the forward and the rear locating surfaces 44, 46. Although the first distance W1 is not necessarily constant for the whole of the cutting portion 24 and although the second distance W2 decreases downwardly along the length of the locating portion 26, the cutting portion 24 is wider than the locating portion 26 in a side view of the cutting insert 14, as can be seen in the figures, and especially in FIGS. 3 and 4. In other words, the first distance W1 is greater than the second distance W2. This gives the cutting insert 14 a flag-shaped profile in a side view thereof. The rear locating surface 46 is located in the rear surface 40 and the forward locating surface 44 is located in the lower surface 36. In addition, a lower locating surface 48 is located in the lower surface 36 opposing the upper surface 34 and extends between the forward surface 38 and the forward locating surface 44.

Figure 5:
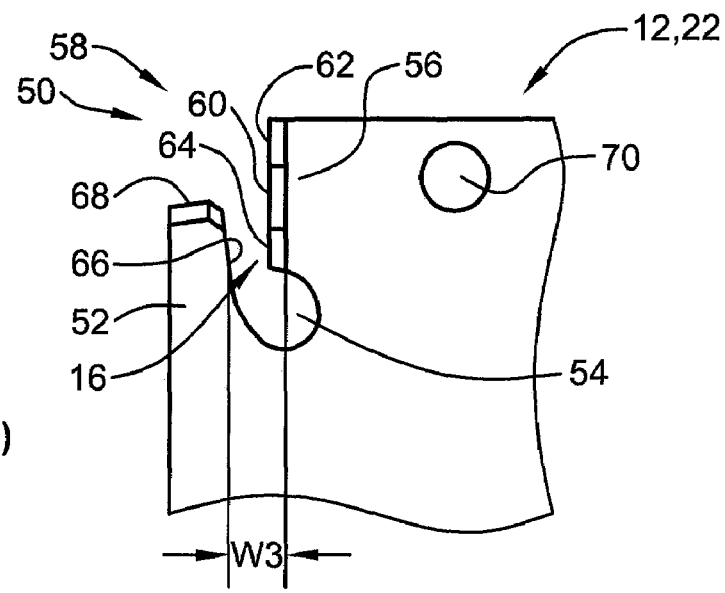
FIG. 5 is a side view of the cutting section of FIG. 3 with the first cutting insert removed.

Referring to FIG. 5, a clamping portion 50 of the insert holder 12, 22 comprises a clamping jaw 52 resiliently connected to a base jaw 56 forming a single integral piece therewith and defining a pocket recess 54 therebetween. The base jaw 56 has an abutment surface 58 adjacent the insert pocket 16. The abutment surface 58 is divided by a base recess 60 into an upper abutment surface 62 along an upper portion thereof and a lower abutment surface 64 along a lower portion thereof. The clamping jaw 52 has a clamping surface 66 adjacent the insert pocket 16 and generally facing opposite the lower abutment surface 64 of the base jaw 56. A third distance W3 is defined between the clamping surface 66 and the lower abutment surface 64. The third distance W3 decreases downwardly. The clamping jaw 52 is further provided with an insert stop surface 68 located at an upper end thereof and generally transverse to the clamping surface 66. The upper and lower abutment surfaces 62, 64 of the base jaw 56 and the clamping surface 66 of the clamping jaw 52 converge downwardly. A through hole 70 located rearwardly of the base jaw 56 is provided for receiving a key to aid in the insertion of the cutting insert 14 into the insert pocket 16 and for removal of the cutting insert 14 from of the insert pocket 16, when used in conjunction with the pocket recess 54.

As seen in FIG. 4, in a side view, the lower locating surface 48 slopes downwardly and forwardly, from the forward locating surface 44 towards the lowermost portion of the forward surface 38. Similarly, as seen in FIG. 5, in a side view, an upper portion of the insert stop surface 68 also slopes downwardly and forwardly, from proximate the clamping surface 66 to the front face of the insert holder 12, 22. When the insert 14 is seated in the insert holder 12, 22, in a side view, the downwardly and forwardly directed lower locating surface 48 abuts the downwardly and forwardly directed inset stop surface 68.

Referring back to FIG. 3, it is seen that with the cutting insert 14 retained in the insert pocket 16, the abutment surfaces 62, 64 of the base jaw 56 abut the rear surface 40 of the cutting insert 14, the clamping surface 66 of the clamping jaw 52 abuts the forward locating surface 44 of the cutting insert 14 and the insert stop surface 68 of the clamping jaw 52 abuts the lower locating surface 48 of the cutting insert 14. The width dimension W2 is generally greater than the width dimension W3, so that when the locating portion 26 is located in the insert pocket 16, the clamping jaw 52 is forced away from the base jaw 56 giving rise to a resilient force which clamps the locating portion 26 in the insert pocket 16.

During a rotary slot cutting operation a centrifugal force F operates on the cutting insert 14. It is clear from FIG. 3 that the clamping surface 66 of the clamping jaw 52 opposes the force F thus preventing the cutting insert 14 from flying out of the insert pocket 16. On completion of a grooving operation, during withdrawal of the cutting tool 10 from a workpiece, the cutting insert 14 can come into contact with the groove walls giving rise to frictional forces F which operate to extract the cutting insert 14 from the insert pocket 16. However, the presence of the clamping surface 66 of the clamping jaw 52 prevents extraction of the cutting insert 14.

FIGS. 6-11 show a cutting tool 210 in which a cutting insert 300 is retained in the insert holder 412 by a combination of resilient clamping and screw-clamping. In this instance, screw-clamping is realized by means of a threaded fastener 380 in the form of a clamping screw 380. The insert holder 412 has a clamping portion 408 having unitary one-piece construction with a body portion 410. The clamping portion 408 includes a clamping jaw 452 resiliently connected to a base jaw 456. An insert pocket 414 is defined between the clamping jaw 452 and the base jaw 456. As seen in the figures, the cutting insert 300 can only be seated in the insert pocket 414 in one orientation, and therefore is non-indexable.

Figure 10:
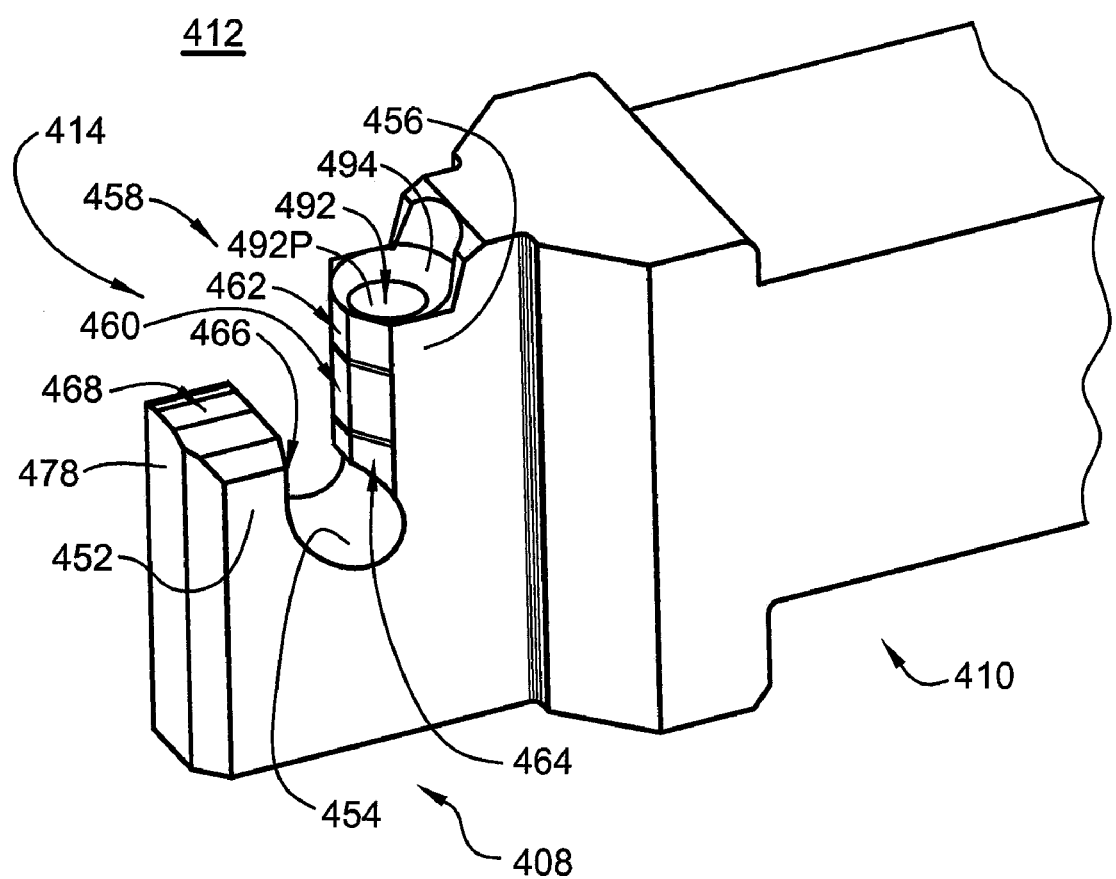
FIG. 10 shows a perspective view of the insert holder seen in FIG. 6.

Turning to FIG. 10, base jaw 456 has a base jaw abutment surface 458. In one embodiment, the base jaw abutment surface 458 includes a base recess 460 that separates an upper abutment surface 462 from a lower abutment surface 464. A vertically directed threaded bore 492 having bore axis B is formed in the base jaw 456, proximate the base jaw abutment surface 458.

The clamping jaw 452 is connected to the base jaw 456 and has unitary one-piece construction therewith. A pocket recess 454 is defined between the clamping jaw 452 and the base jaw 456 and provides a measure of resilience between the two. The clamping jaw 452 has a clamping jaw clamping surface 466 facing opposite a lower portion of the base jaw abutment surface 458. As seen in FIG. 10, the clamping jaw clamping surface 466 faces opposite the lower abutment surface 464 of the base jaw abutment surface, but does not face opposite the base jaw's upper abutment surface 462.

Figure 9:
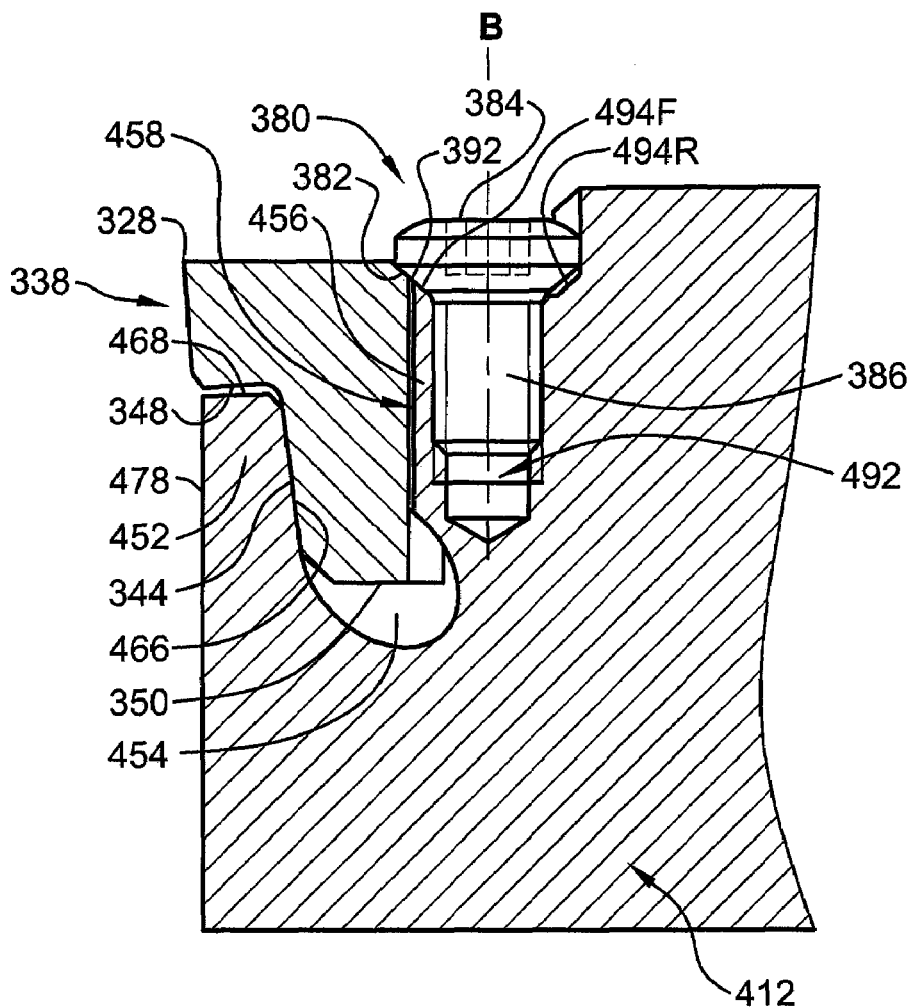
FIG. 9 shows a partial section view of the cutting tool shown in FIG. 8 along section line IX-IX.
Figure 11:
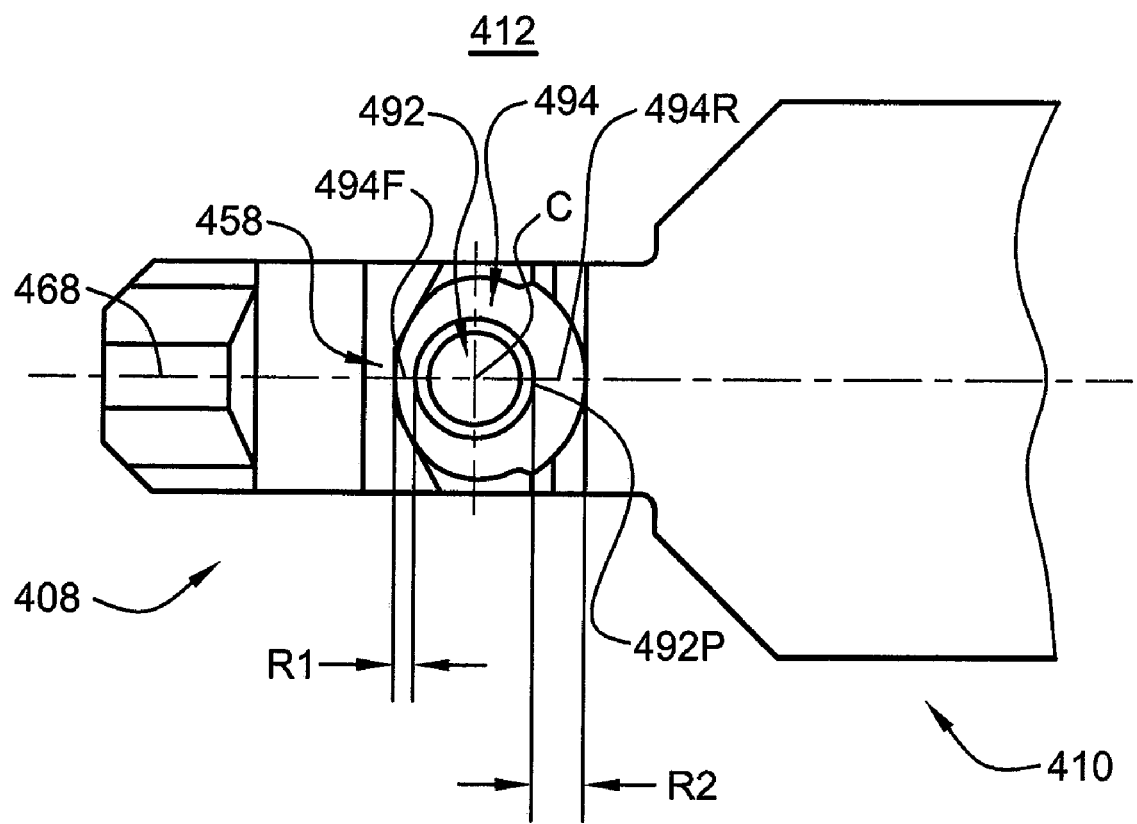
FIG. 11 shows a top view of the insert holder seen in FIG. 6.

As seen in FIGS. 9-11, the clamping jaw 452 is provided with an insert stop surface 468 that is generally transverse to the base jaw abutment surface 458. In the embodiment shown, the base jaw abutment surface 458 and the insert stop surface 468 are both convex and formed by a plurality of mutually adjoining planar segments. It is understood that any cutting insert intended to be retained in the insert holder 412 must then have suitably mating concave surfaces. Such mating convex and concave surfaces may help prevent lateral movement of the cutting insert 300 with respect to the insert holder 412. It is further understood that either or both of the base jaw abutment surface 458 and the insert stop surface 468 may be concave instead, with the cutting insert's corresponding surfaces being appropriately modified.

Figure 6:
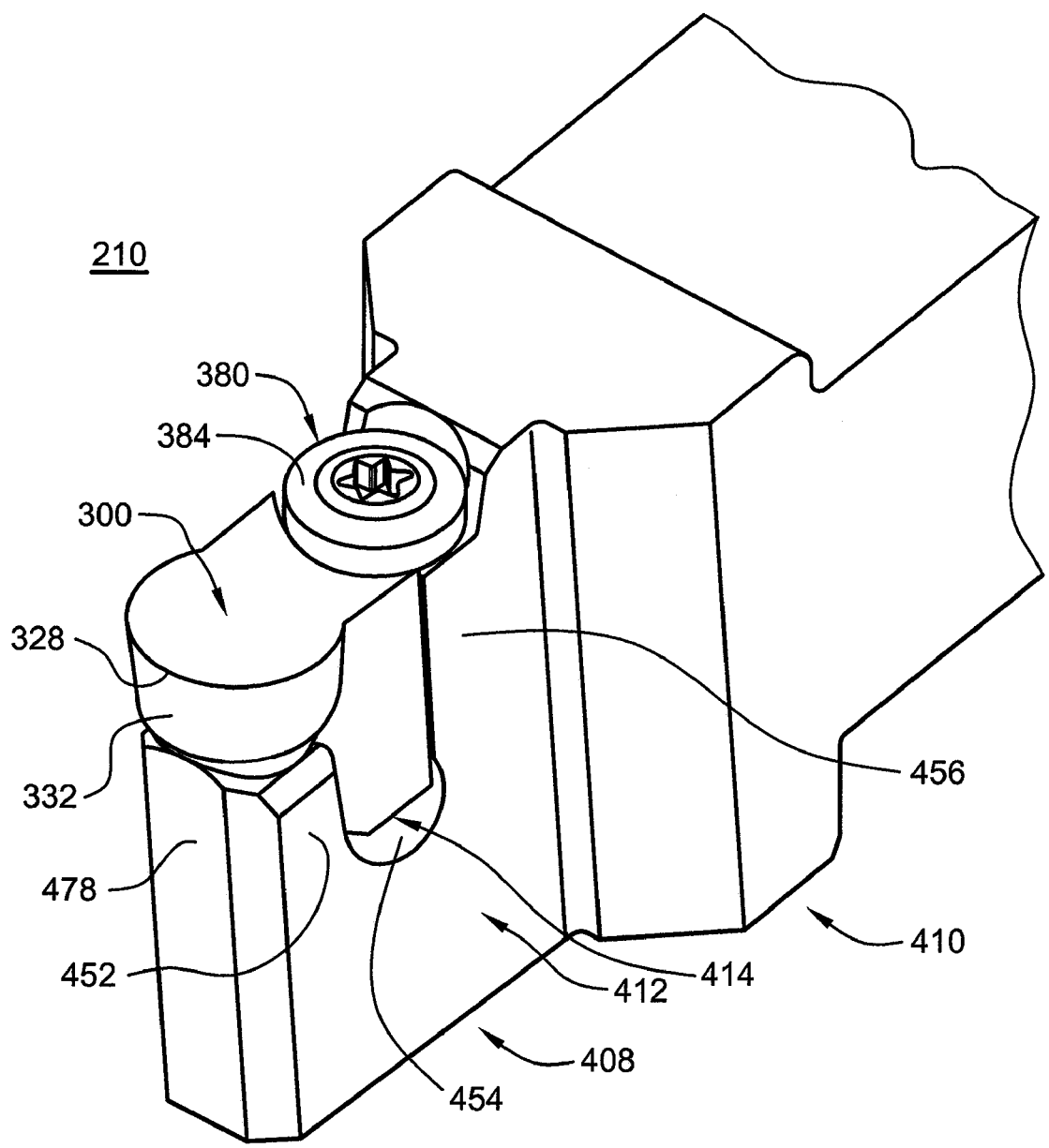
FIG. 6 shows a perspective view of a cutting tool employing both resilient and screw clamping in accordance with one embodiment of the present invention.
Figure 7:
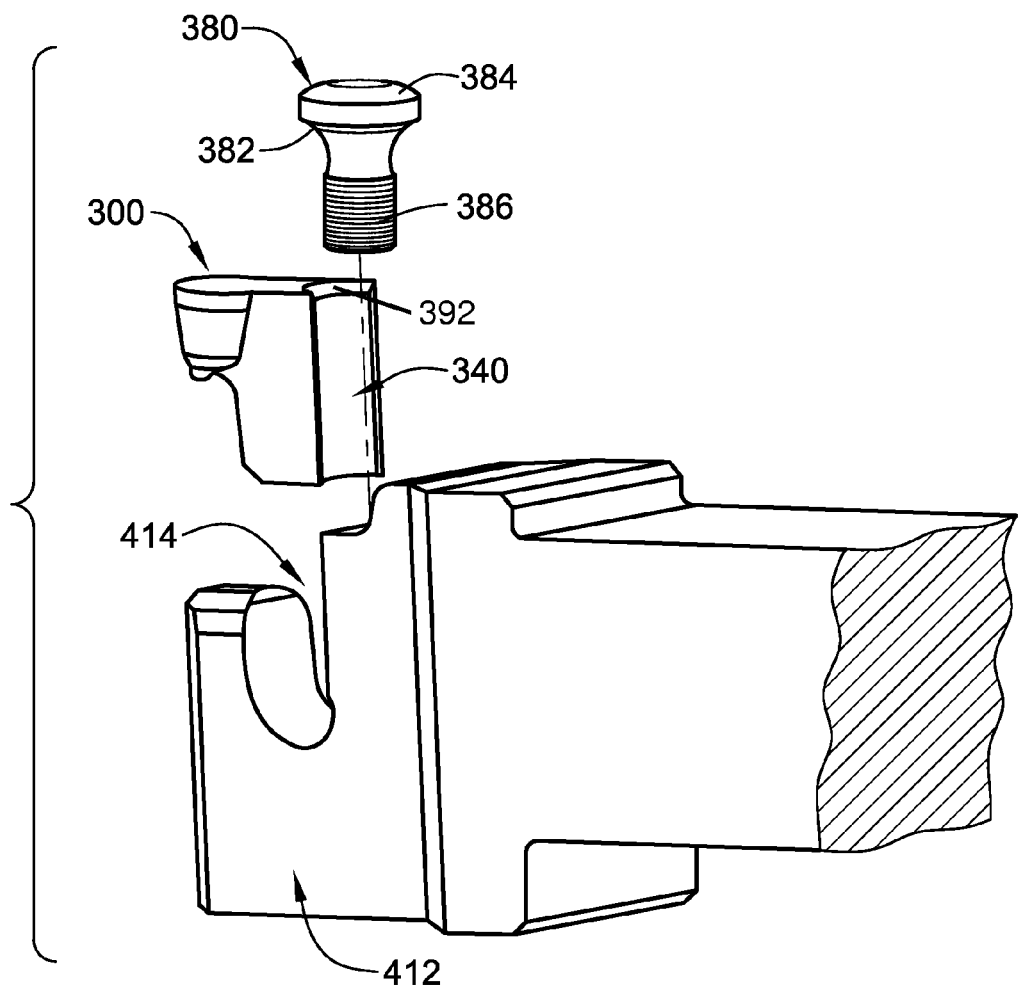
FIG. 7 shows an exploded view of the cutting tool of FIG. 6.

With reference to FIGS. 6, 7 and 9, the cutting insert 300 is retained in the insert pocket 414 between the clamping jaw 452 and the base jaw 456. As also seen in these figures, the clamping screw 380 is retained in the threaded bore 492 of the base jaw 456 with a screw clamping surface 382 of the clamping screw 380 abutting the recess abutment surface 392 of the cutting insert 300. When the screw clamping surface 382 abuts the recess abutment surface 392, the cutting insert 300 is biased, or forced, against the clamping jaw 452, thereby securing the insert 300 in the insert holder 412.

Figure 8:
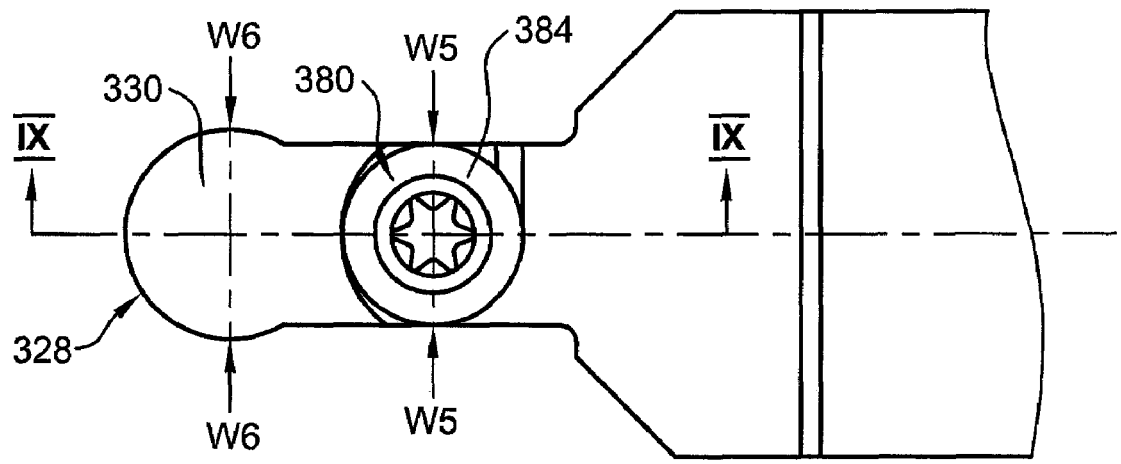
FIG. 8 shows a top view of the cutting tool shown in FIG. 6.

As seen in FIG. 8, the maximum width W6 of the cutting insert, in a top view of the assembled tool, is preferably more than the diameter W5 of the clamping screw 380. This is especially important in blades, slotting cutters, and the like, where it may be desirable to achieve a depth of cut which matches or exceeds the distance between a forwardmost portion of the cutting edge 328 and the clamping screw 380 positioned proximate the rear of the cutting insert.

The cutting insert 300 is devoid of a through bore of the sort commonly used for clamping an insert in an insert holder by means of a clamping screw. As such, the clamping screw 380 clamps cutting insert 300 without penetrating the latter. And since the clamping screw 380 is not inserted into a through bore of the cutting insert 300 but rather only abuts and biases the cutting insert 300 in a forward and downward direction, only a forwardly facing portion of the screw clamping surface 382 abuts the rearwardly facing recess abutment surface 392 of the cutting insert 300.

As best seen in FIG. 11, the threaded bore 492 has an opening 492P which is surrounded by a seating surface 494 shaped and dimensioned to receive the screw clamping surface 382 of the screw 380. A forward portion 494F of the seating surface 494 is narrower in a radial direction centered about the center C of the threaded bore 492, than a rear portion 494R of the seating surface 494. In other words, in a top view of the cutting insert, the forward portion 494F of the seating surface 494 has a first radial thickness R1 that is smaller than a second radial thickness R2 of the rear portion 494R of the seating surface 494. As seen in the tool cross-section of FIG. 9, when the tool is assembled, the forwardly facing portion of the screw clamping surface 382 covers the narrow forward portion 494F of the seating surface 494, crosses the base jaw abutment surface 458, and further extends in the forward direction of the tool so that it overlies and abuts a rearwardly facing portion of recess abutment surface 392.

Figure 12:
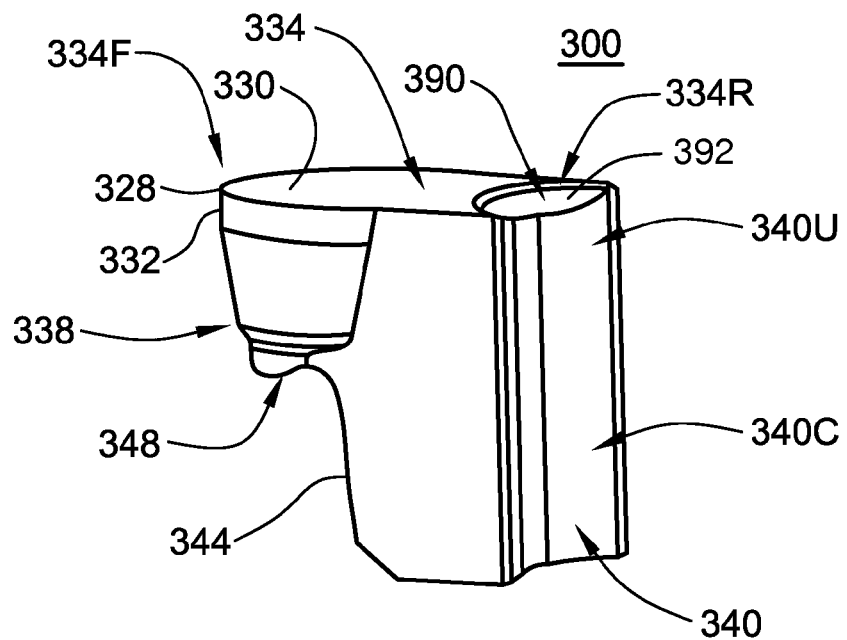
FIG. 12 shows a perspective view of a cutting insert having a clamping recess and a recess abutment surface in accordance with the present invention.
Figure 13:
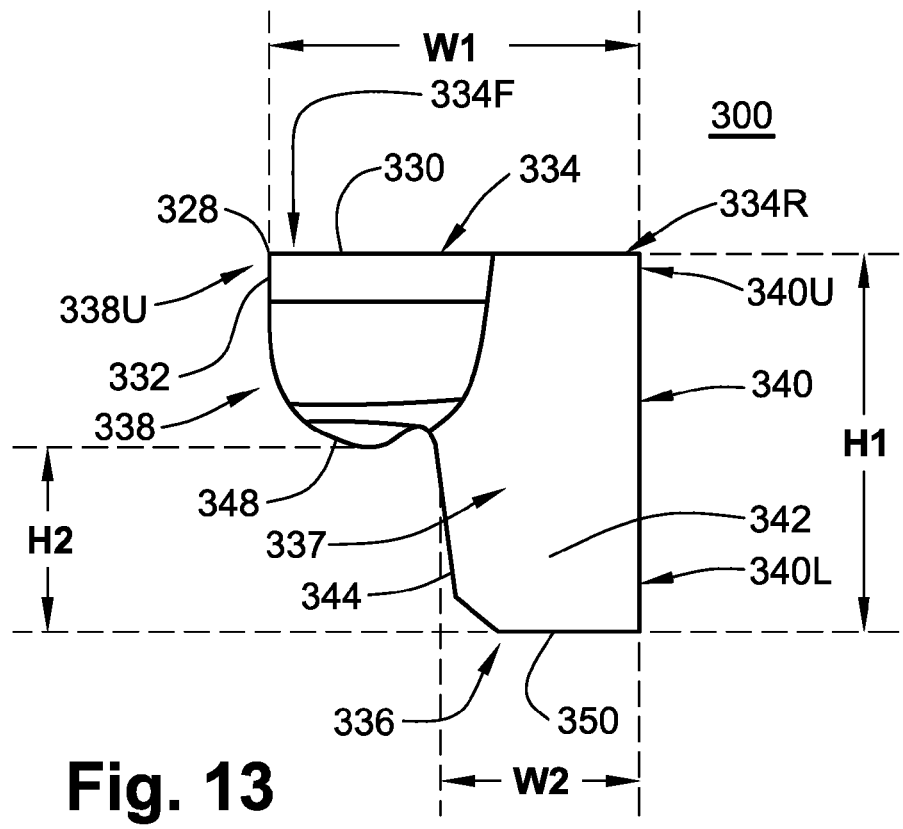
FIG. 13 shows a side view of the cutting insert of FIG. 12.

FIGS. 12-15 show a cutting insert 300 which is suitable for retaining in an insert pocket 414 using a combination of resilient and screw-type clamping. As best seen in FIG. 13, cutting insert 300, like cutting insert 214, has a flag-shaped profile in a side view thereof. In addition, in the embodiments shown, both cutting inserts 214, 300 are devoid of a through bore for accommodating a clamping screw or other threaded member to secure the insert to an insert holder. Also, it is further understood that cutting insert 300 may be used in the insert holder portions, blades etc. of a variety of cutting tools. As such, cutting insert 300 may be used in e.g., a rotary slot cutting tool, a grooving or parting off tool, and even a turning tool, in which case the insert holder may be a holder blade.

The cutting insert 300 includes an upper surface 334, a lower surface 336, and a peripheral side surface 337 extending between the upper 334 and lower surfaces 336. The peripheral side surface 337 includes opposing forward and rear surfaces 338, 340, respectively, and opposing side surfaces 342 (only one side surface visible in FIG. 13) extending between the forward 338 and rear 340 surfaces. The cutting insert 300 has a first cutting edge 328 formed at the intersection of a rake surface 330 which is formed at a forward portion 334F of the upper surface 334, with a relief surface 332 which is formed at an upper portion 338U of the forward surface 338. It is understood, however, that the exact shape of the cutting edge does not impact the present invention. As seen in the side view of the cutting insert 300, the forward portion 334F of the upper surface 334 and the rear portion 334R of the upper surface 334 are approximately at the same level, "approximate" in this instance being defined as within 5% of the height H1 of the cutting insert 300. In a particularly preferred embodiment, the maximum width W6 of the cutting insert 300, in a top view thereof, is between 5 and 12 mm.

Figure 14:
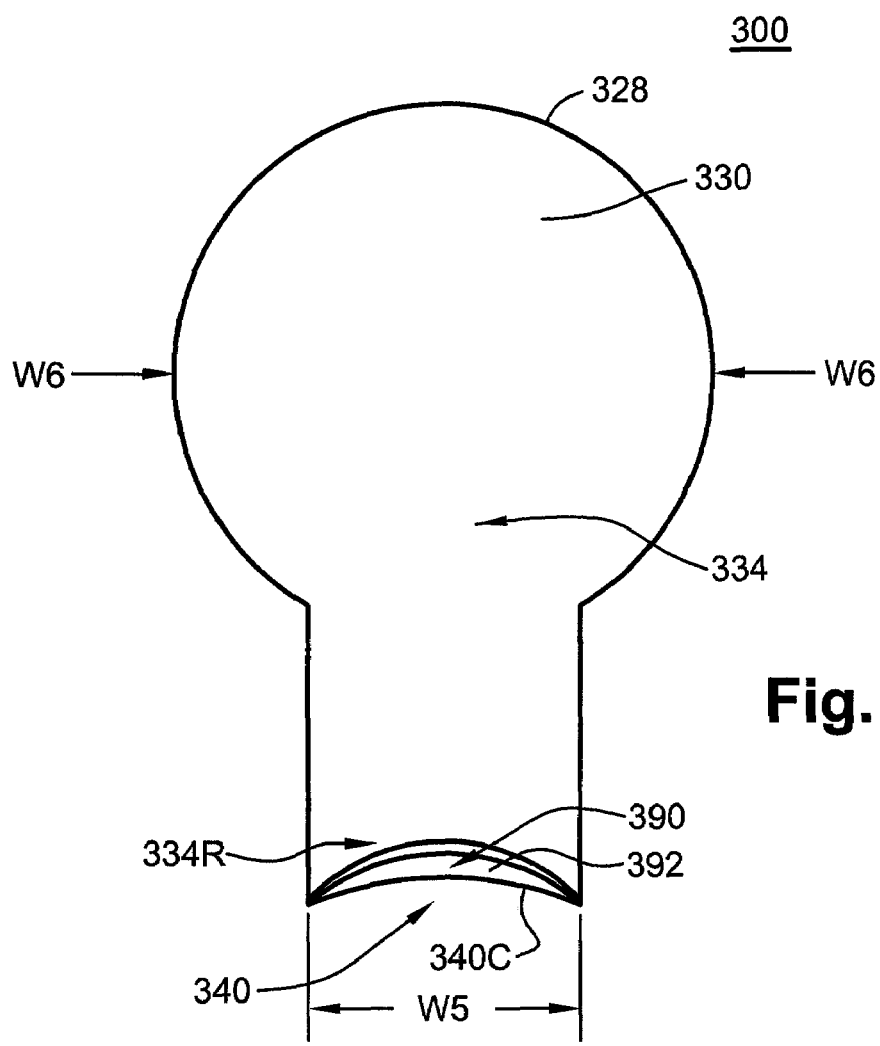
FIG. 14 shows a top view of the cutting insert of FIG. 12.
Figure 15:
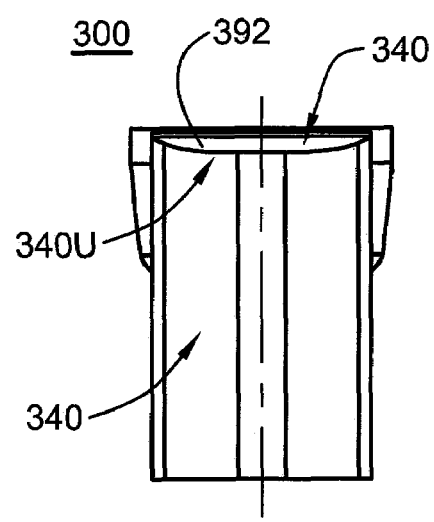
FIG. 15 shows a rear view of the cutting insert of FIG. 12.

As seen in FIGS. 12 and 14-15, the cutting insert 300 has an insert clamping recess 390 formed at an intersection between a rear portion 334R of the upper surface 334 and an upper portion 340U of the rear surface 340. The insert's clamping recess 390 comprises a recess abutment surface 392 extending widthwise of the rear surface 340. As seen in FIG. 14, the recess abutment surface 392 is arcuate in a top view of the insert and, in some embodiments, may form a circular arc. As best seen in FIGS. 14 and 15, the clamping recess 390 and the recess abutment surface 392 are visible in both a rear end view and a top view of the cutting insert 300. In one embodiment, the insert's clamping recess 390 extends across the entire width W5 of the rear surface 340. The recess abutment surface 392, too, may also extend across the entire width W5 of the rear surface 340. In other embodiments, the insert's clamping recess 390 and the recess abutment surface 392 may extend only across at least 75%, and more preferably across at least 90%, of the width of the rear surface 340.

The insert's clamping recess 390 and the recess abutment surface 392 allow the cutting insert 300 to be clamped by a threaded fastener 380, such as a clamping screw 380. In one embodiment, the clamping screw 380 abuts and thereby clamps the cutting insert 300 at the rear portion 334R of the upper surface 334. More particularly, a screw clamping surface 382 formed between the screw head 384 and the screw shaft 386 abuts and clamps the cutting insert's recess abutment surface 392.

In one embodiment, the recess abutment surface 392 comprises a curved surface having a first radius of curvature RC1 while the screw clamping surface 382 formed on the screw 380 comprises a curved surface having a second radius of curvature RC2. As best visualized in FIG. 8, the recess abutment surface 392 and the screw clamping surface 382 generally correspond in shape and size, however, the first radius of curvature RC1 may be slightly larger than the second radius of curvature RC2, or a first cone angle C1 of the conical recess abutment surface 392 may be more than a second cone angle C2 of the conical screw clamping surface 382, or both, so as to permit the screw to be inserted into the threaded bore. Thus, when the screw clamping surface 382 of the threaded fastener abuts the recess abutment surface 392 of the cutting insert 300, the cutting insert 300 is forced against the clamping jaw 452, thereby preloading the insert 300 to secure it in the insert holder 412.

As also seen in FIG. 13, the lower surface 336 of the cutting insert 300 is stepped in a side view thereof. The lower surface 336 has a lower locating surface 348 that is vertically spaced apart from a non-locating free surface 350 by a forwardly-facing forward locating surface 344. Furthermore, the lower locating surface 348 is vertically higher than the non-locating free surface 350 by a minimum height of H2, which generally is no less than one-third of H1. The lower locating surface 348 is thus located in the lower surface 336, opposes the upper surface 334, and extends between the forward surface 338 and the forward locating surface 344. Meanwhile, the forward locating surface 344 opposes a rear locating surface 340L which forms part of the rear surface 340. In the embodiment shown, the forward locating surface 344 and rear locating surface 340L converge towards one another in a direction of the non-locating free surface 350.

As best seen in FIG. 12, the cutting insert's rear surface 340 may comprise a concave surface 340C formed by a plurality of mutually adjoining planar segments. The rear surface 340, including the rear locating surface 340L, comprises a concave surface 340C that communicates with the insert's clamping recess 390 and extends downwardly to the non-locating free surface 350 of the cutting insert's lower surface 336.

When the cutting insert 300 is retained in the insert holder 412, the base jaw abutment surface 458 abuts the rear surface 340 of the cutting insert 300 while the clamping jaw clamping surface 466 abuts the forward locating surface 344 of the cutting insert 300, and the insert stop surface 468 of the clamping jaw 452 abuts the lower locating surface 348 of the cutting insert 300.

In some embodiments, the clamping jaw's insert stop surface 468 slopes downwardly and forwardly, from an upper portion of the clamping jaw clamping surface 466 to a front face 478 of the insert holder 412. Meanwhile, the cutting insert's lower locating surface 348 slopes downwardly and forwardly, from an upper portion of the cutting insert's forward locating surface 344 towards the cutting insert's forward surface 338. In such case, the downwardly and forwardly sloping lower locating surface 348 abuts the downwardly and forwardly sloping insert stop surface 468.

Also, when the cutting insert 300 is retained in the insert holder 412, the non-locating free surface 350 is not abutted by either the base jaw 456 or the clamping jaw 452. Thus, the non-locating free surface 350 remains unabutted and is open to the pocket recess 454 formed between the clamping jaw 452 and the base jaw 456.

To assemble the tool from a completely disassembled state, one first partially inserts the cutting insert 300 into the insert pocket 414 between the clamping jaw 452 and the base jaw 456 such that the insert rear surface 340 abuts the base jaw abutment surface 458. Next, one inserts the clamping screw 380 into the threaded bore 492 and screws in the clamping screw 380 until it first abuts the cutting insert 300, and then forces the cutting insert 300 into the insert pocket 414 such that the cutting insert's lower locating surface 348 abuts the insert stop surface 468.

Removal of the cutting insert 300 from the assembled tool may be accomplished by first loosening and/or unscrewing the clamping screw 380 with a screwdriver, inserting the end of the screwdriver in the pocket recess 454, and then prying the insert outwardly until it can manually be removed. Other tools, such as a pliers, or the like, may also be used to remove the cutting insert 300 once the clamping screw 380 has been loosened and/or completely unscrewed.

Figure 16:
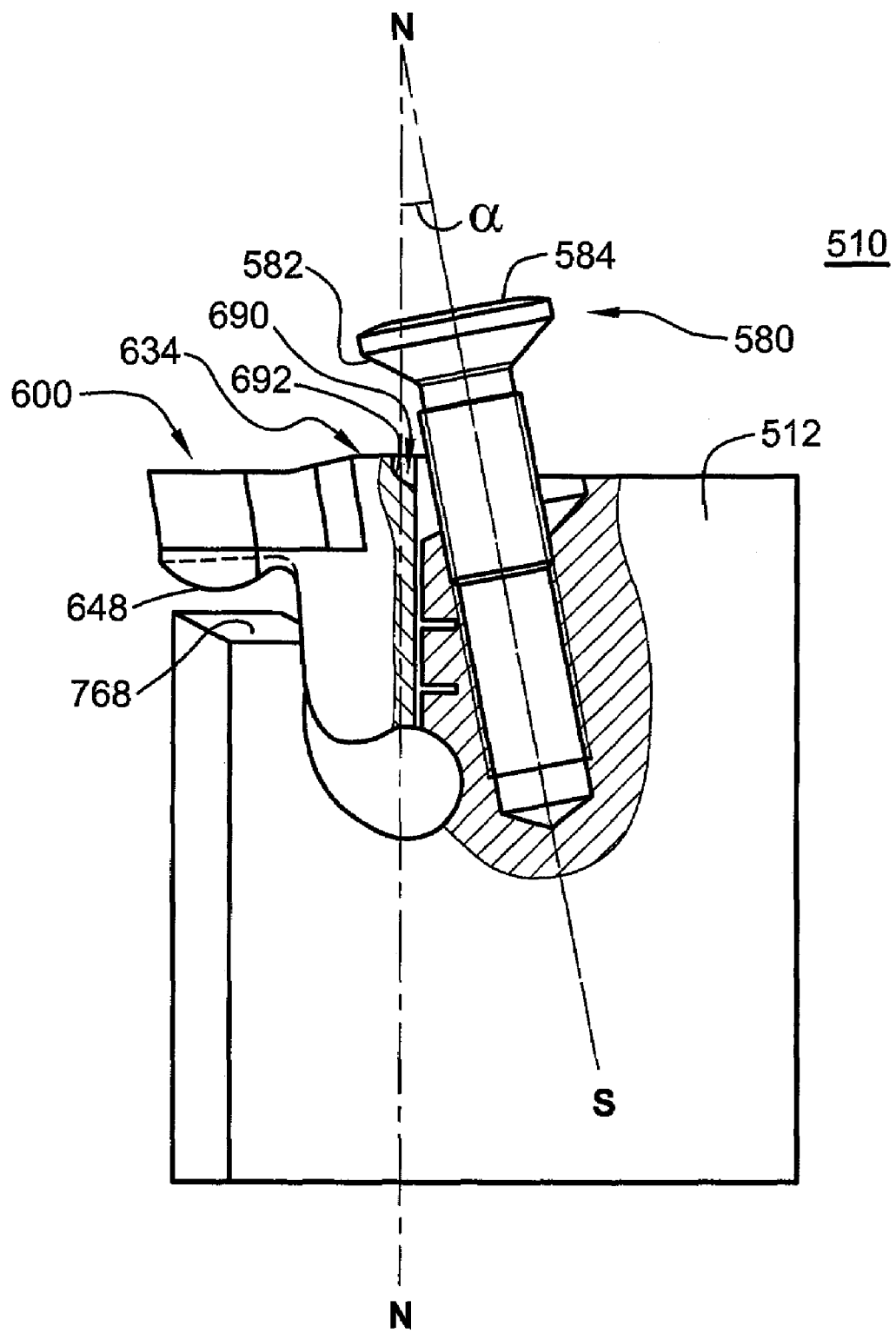
FIG. 16 shows a side view of a cutting tool employing both resilient and screw clamping in accordance with a second embodiment of the present invention.

FIG. 16 shows an alternate embodiment of a cutting tool 510 in which the clamping screw 580 is tilted toward the front of the cutting tool. The screw axis S is forwardly tilted at a non-zero angle α relative to a normal N to an upper surface 634 of the cutting insert 600, in which upper surface 634 the insert's clamping recess 690 is formed. In such an embodiment, α is generally between 5°-20°. Forwardly tilting the clamping screw 580 potentially allows for a more downwardly-directed force applied by the screw clamping surface 582 against the recess abutment surface 692, and thus by the lower locating surface 648 against the insert stop surface 768. It is understood that when the clamping screw 580 is tilted at a given angle, the cutting insert's recess abutment surface 692 will also have to be tilted in a similar manner, relative to the insert's clamping recess 690.

The cutting tools of the types described above facilitate preloading of the cutting insert in the insert pocket by positively clamping the insert with a threaded fastener, so that the screw clamping surface of the threaded fastener abuts the recess abutment surface of the cutting insert, without the threaded fastener penetrating the cutting insert. By providing such preloading, the cutting insert may be more positively and/or precisely secured in the insert pocket prior to contacting the workpiece thereby reducing the likelihood of damage to the workpiece or the cutting tool.

Although the present invention has been described to a certain degree of particularity, it should be understood that various alterations and modifications could be made without departing from the scope of the invention as hereinafter claimed.

What is claimed is:

1. A non-indexable cutting insert comprising:
   an upper surface, a lower surface and a peripheral side surface extending between the upper and lower surfaces;
   the peripheral side surface comprising opposing forward and rear surfaces and opposing side surfaces extending between the forward and rear surfaces;
   a first cutting edge formed at the intersection of a forward portion of the upper surface with an upper portion of the forward surface; and
   a clamping recess formed at an intersection between a rear portion of the upper surface and an upper portion of the rear surface, the clamping recess comprising a recess abutment surface extending widthwise of the rear surface, the recess abutment surface being arcuate, in a top view of the insert, wherein:
   the lower surface is stepped in a side view of the cutting insert, the lower surface having a lower locating surface that is vertically spaced apart from a non-locating free surface by a forward locating surface.

2. The non-indexable cutting insert according to claim 1, wherein the clamping recess extends across the entire width of the rear surface.

3. The non-indexable cutting insert according to claim 2, wherein the recess abutment surface extends across the entire width of the rear surface.

4. The non-indexable cutting insert according to claim 1, wherein the rear surface comprises a concave surface that communicates with the clamping recess and extends downwardly to the lower surface.

5. The non-indexable cutting insert according to claim 1, wherein the forward portion of the upper surface and the rear portion of the upper surface are approximately at the same level, in a side view of the cutting insert.

6. The non-indexable cutting insert according to claim 1, wherein:
   the forward locating surface opposes a rear locating surface which forms part of the rear surface;
   the lower locating surface is between the forward surface and the forward locating surface; and
   the lower locating surface is vertically higher than the non-locating free surface.

7. The non-indexable cutting insert according to claim 6, wherein the rear surface, including the rear locating surface, comprises a concave surface that communicates with the clamping recess and extends downwardly to the non-locating free surface.

8. The non-indexable cutting insert according to claim 6, wherein the forward locating surface and rear locating surface converge towards one another in a direction of the non-locating free surface.

9. The non-indexable cutting insert according to claim 6, wherein the cutting insert is flag-shaped, in a side view thereof.

10. The non-indexable cutting insert according to claim 1, wherein the cutting insert is devoid of a through bore suitable for accommodating a clamping screw.

11. The non-indexable cutting insert according to claim 1, wherein:
   the clamping recess extends across the entire width of the rear surface;
   the rear surface comprises a concave surface that communicates with the clamping recess and extends downwardly to the lower surface;
   the recess abutment surface comprises a conical surface;
   the recess abutment surface is visible in both a top view and a rear end view of the cutting insert;
   the forward portion of the upper surface and the rear portion of the upper surface are approximately at the same level, in a side view of the cutting insert; and
   the cutting insert is devoid of a through bore suitable for accommodating a clamping screw.

12. The non-indexable cutting insert according to claim 11, wherein:
the forward locating surface opposes a rear locating surface which forms part of the rear surface;
the lower locating surface is between the forward surface and the forward locating surface; and
the lower locating surface is vertically higher than the non-locating free surface.

13. The non-indexable cutting insert according to claim 12, wherein the rear surface, including the rear locating surface, comprises a concave surface that communicates with the clamping recess and extends downwardly to the non-locating free surface.

14. The non-indexable cutting insert according to claim 13, wherein the forward locating surface and rear locating surface converge towards one another in a direction of the non-locating free surface.

15. The non-indexable cutting insert according to claim 14, wherein the cutting insert is flag-shaped, in a side view thereof.

16. The non-indexable cutting insert according to claim 1, wherein a cutting portion of the cutting insert has a maximum width of between 5 and 12 mm, in a top view thereof.

17. A non-indexable cutting insert comprising:
an upper surface, a lower surface and a peripheral side surface extending between the upper and lower surfaces;
the peripheral side surface comprising opposing forward and rear surfaces and opposing side surfaces extending between the forward and rear surfaces;
a first cutting edge formed at the intersection of a forward portion of the upper surface with an upper portion of the forward surface; and
a clamping recess formed at an intersection between a rear portion of the upper surface and an upper portion of the rear surface, the clamping recess comprising a recess abutment surface extending widthwise of the rear surface, the recess abutment surface being arcuate, in a top view of the insert,
wherein the recess abutment surface comprises a conical surface.

18. A non-indexable cutting insert comprising:
an upper surface, a lower surface and a peripheral side surface extending between the upper and lower surfaces;
the peripheral side surface comprising opposing forward and rear surfaces and opposing side surfaces extending between the forward and rear surfaces;
a first cutting edge formed at the intersection of a forward portion of the upper surface with an upper portion of the forward surface; and
a clamping recess formed at an intersection between a rear portion of the upper surface and an upper portion of the rear surface, the clamping recess comprising a recess abutment surface extending widthwise of the rear surface, the recess abutment surface being arcuate, in a top view of the insert,
wherein the recess abutment surface is visible in both a top view and a rear end view of the cutting insert.

19. A cutting tool comprising:
an insert holder having a clamping portion comprising:
a base jaw having a base jaw abutment surface and a threaded bore adjacent the base jaw abutment surface; and
a clamping jaw connected to a base jaw and having unitary one-piece construction therewith, the clamping jaw having a clamping jaw clamping surface facing opposite a lower portion of the base jaw abutment surface;
a non-indexable cutting insert seated between the clamping jaw and the base jaw; wherein the non-indexable cutting insert comprises:
an upper surface, a lower surface and a peripheral side surface extending between the upper and lower surfaces;
the peripheral side surface comprising opposing forward and rear surfaces and opposing side surfaces extending between the forward and rear surfaces;
a first cutting edge formed at the intersection of a forward portion of the upper surface with an upper portion of the forward surface; and
a clamping recess formed at an intersection between a rear portion of the upper surface and an upper portion of the rear surface, the clamping recess comprising a recess abutment surface extending widthwise of the rear surface, the recess abutment surface being arcuate, in a top view of the insert; and
a threaded fastener retained in the threaded bore of the base jaw with a screw clamping surface of the threaded fastener abutting the recess abutment surface of the cutting insert, without the threaded fastener penetrating the cutting insert.

20. The cutting tool according to claim 19, wherein:
when the clamping surface of the threaded fastener abuts the recess abutment surface of the cutting insert, the cutting insert is forced against clamping jaw, thereby securing the insert in the insert holder.

21. The cutting tool according to claim 19, wherein:
the cutting insert is devoid of a through bore suitable for receiving said threaded fastener; and
only the clamping surface of the threaded fastener contacts the cutting insert.

22. The cutting tool according to claim 19, wherein:
the threaded bore has an opening which is surrounded by a seating surface shaped and dimensioned to receive the screw clamping surface of the threaded fastener; and
in a top view of the cutting insert, a forward portion of the seating surface has a first radial thickness that is smaller than a second radial thickness of a rear portion of the seating surface.

23. The cutting tool according to claim 22, wherein:
a forwardly facing portion of the screw clamping surface covers the narrow forward portion of the seating surface and extends in the forward direction of the tool so that it overlies and abuts a rearwardly facing portion of the recess abutment surface.

24. The cutting tool according to claim 19, wherein:
the threaded fastener is tilted at a non-zero angle relative to a normal to an upper surface of cuffing insert, in which upper surface the clamping recess is formed.

25. The cutting tool according to claim 19, wherein:
the clamping jaw is provided with an insert stop surface that is generally transverse to the base jaw clamping surface;
the base jaw abutment surface abuts the rear surface of the cutting insert;
the clamping jaw clamping surface abuts the forward locating surface of the cutting insert; and
the insert stop surface of the clamping jaw abuts the lower locating surface of the cutting insert.

26. The cutting tool according to claim 25, wherein:
the insert stop surface is convex; and
the base jaw abutment surface is convex.

27. The cutting tool according to claim 25, wherein:
the base jaw abutment surface is divided by a base recess into an upper abutment surface and lower abutment surface.

28. The cutting tool according to claim 19, wherein, in a side view:
the clamping jaw is provided with an insert stop surface that is generally transverse to the base jaw abutment surface;
the insert stop surface slopes downwardly and forwardly, from proximate the clamping jaw clamping surface to a front face of the insert holder;
the lower locating surface slopes downwardly and forwardly, from the forward locating surface towards the forward surface; and
the downwardly and forwardly sloping lower locating surface abuts the downwardly and forwardly sloping insert stop surface.

29. The cutting tool according to claim 19, wherein:
the insert holder's base jaw is connected to the clamping jaw via a pocket recess;
the cutting insert's lower surface is stepped in a side view of the cutting insert, the lower surface having a lower locating surface that is vertically spaced apart from a non-locating free surface by a forward locating surface; and
and the non-locating free surface is open to the pocket recess.

30. The cutting tool according to claim 19, wherein the cutting tool is a rotary slot cutting tool.

31. The cutting tool according to claim 19, wherein the cutting tool is a grooving, parting off or turning tool and the insert holder is a holder blade.

* * * * *